United States Patent [19]

Brandon, Jr.

[11] Patent Number: 5,186,324
[45] Date of Patent: Feb. 16, 1993

[54] PACKAGED HYDRAULIC OIL TANK ASSEMBLY AND ATTACHMENT KIT

[76] Inventor: Darrell W. Brandon, Jr., P.O. Box 1143, Marion, Ind. 46952-7543

[21] Appl. No.: 647,500

[22] Filed: Jan. 24, 1991

[51] Int. Cl.$^5$ ............................................. B65D 85/68
[52] U.S. Cl. .................................. 206/223; 137/592; 220/562; 280/834
[58] Field of Search .............................. 206/320, 223; 220/562-564, 4.12, 4.15, 86.1, 86.2; 229/DIG. 4; 280/830, 834; 137/315, 316, 563, 581, 587, 590, 592; 141/18, 113, 286

[56] References Cited

U.S. PATENT DOCUMENTS

| | | | |
|---|---|---|---|
| 2,321,063 | 6/1943 | Bohnke | 206/320 |
| 2,564,172 | 8/1951 | Raaberg et al. | 137/592 |
| 3,610,457 | 10/1971 | Opalewski | 220/563 |
| 3,682,197 | 8/1972 | Snyder | 137/592 |
| 3,697,093 | 10/1972 | Cadiou | 280/834 |
| 4,003,399 | 1/1977 | Fischer | 137/592 |
| 4,143,193 | 3/1979 | Rees | 280/834 |
| 4,886,180 | 12/1989 | Bonczyk | 280/834 |
| 4,936,349 | 6/1990 | Cowgur | 137/590 |

FOREIGN PATENT DOCUMENTS 0214296 3/1961 Austria ........................... 220/562
3710264 10/1988 Fed. Rep. of Germany ... 229/DIG. 4

OTHER PUBLICATIONS

Wet Line System brochure, Muncie Power Products.
Mobile Power Equipment brochure, Muncie Power Products.

Primary Examiner—Jimmy G. Foster

[57] ABSTRACT

A tank assembly stores hydraulic oil in a system for actuating hydraulically operated cylinders, specifically on Class VI, VII and VIII trucks. A pump draws the fluid from the tank to force the hydraulic cylinder to an upright position. When the pump valve is shifted to the down position, the hydraulic fluid is returned to the storage tank at a reduced velocity without the reduction of the rate of flow in gallons per minute below the rated pump capacity, thus preventing the aeration of the fluid. An attachment kit includes grooves in the top of the tank-receiving nylon belts with loops at their ends receiving U-bolts for attaching to flanges of a tray, for mounting on a truck.

8 Claims, 3 Drawing Sheets

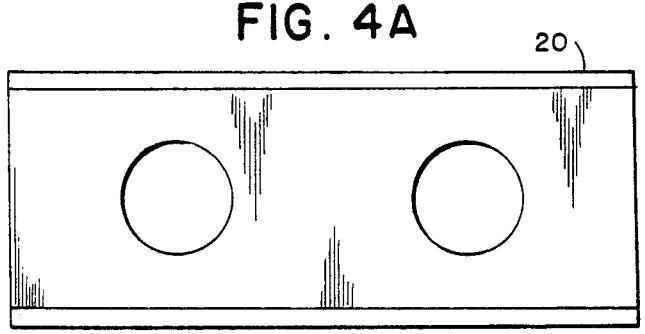
FIG. 4A
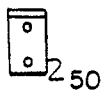
FIG. 4D
FIG. 4E
FIG. 4B
FIG. 4C
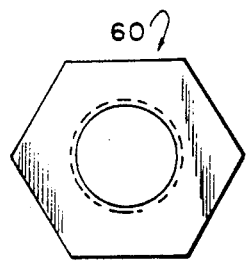
FIG. 6B
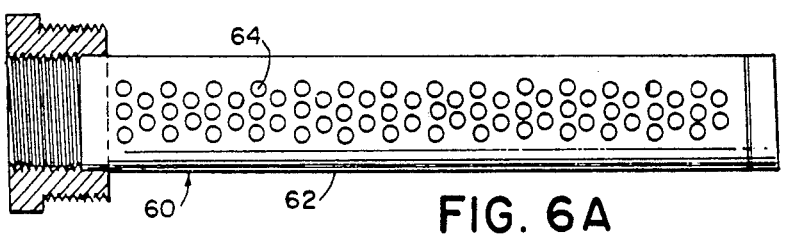
FIG. 6A
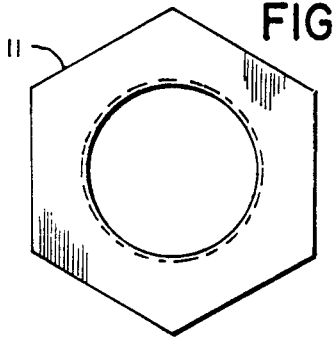
FIG. 7B
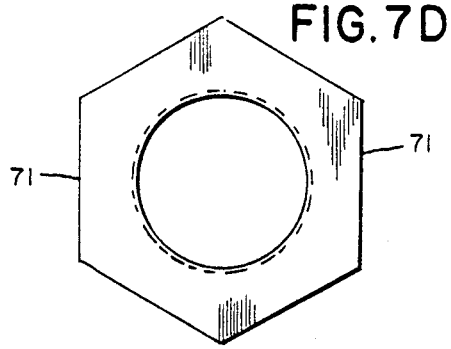
FIG. 7D
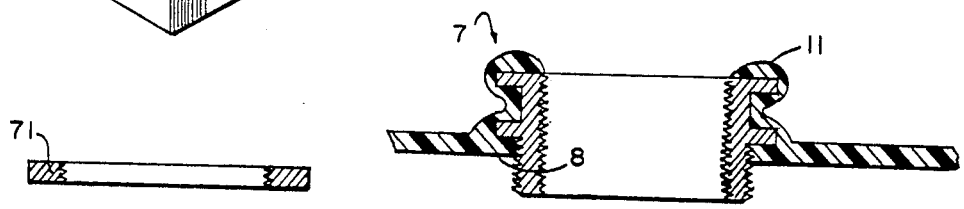
FIG. 7C  FIG. 7A

PACKAGED HYDRAULIC OIL TANK ASSEMBLY AND ATTACHMENT KIT

BACKGROUND OF THE INVENTION

This invention relates to a tank assembly for storing hydraulic oil in a system for actuating hydraulically operated cylinders. More specifically, this invention comprises a tank assembly for storing hydraulic fluid on Class VI, VII, and VIII trucks as applied in the heavy-duty truck market in the United States. As the hydraulic system is actuated, the pump draws hydraulic fluid from the tank for use in forcing the hydraulic cylinder, mounted under the dump trailer, into an upright position in order to discharge the commodity being transferred. As the pump valve is shifted to the down position, the hydraulic fluid returns through the system to the tank assembly for storage. This returning fluid must not be allowed to aerate; therefore, the velocity of the returning hydraulic fluid must be reduced without reducing the rate of flow in gallons per minute below the rated pump capacity at 1000 rpms.

Prior storage systems use both conventional metal and molded polyethylene reservoirs as storage components for the hydraulic fluid. Each of these systems have inherent problems troubling to the product user. Conventional metal reservoirs have welded seams which, depending on the skill of the welder, can leak or leave a metal slag residue. These contaminants, such as slag, sands, and rust, range in the 100-200 micron size. This size contaminant causes problems because high pressure hydraulic components cannot pass particles larger than 10 microns without eventual destruction to the system.

Prior molded polyethylene reservoirs have addressed and corrected the contamination problems inherent in the fabricated metal reservoirs; however, three distinct problems have arisen with the use of the molded reservoirs: 1) annoying leaks at the junction where the metal port fitting is molded into the polyethylene; 2) tank distortion caused by the occasional heat build-up in the hydraulic system and consequently the hydraulic fluid stored in the reservoir; and 3) inadequately providing for a convenient and effective procedure for diffusing hydraulic fluids as they are returned to the storage reservoir or tank.

SUMMARY OF THE INVENTION

The molded polyethylene tank has proven its ability to reduce, if not eliminate, the possibility of weakened seams or bursting of the reservoir as shown in prior art. It will be apparent from the foregoing that the object of the present invention is to provide a contaminant-free environment that is resistant to bursting or puncture, resistant to warping or physical distortion, and free from leaks at the points of metal port installation.

This pre-packaged tank system will further provide a convenient diffuser system that may be used in either of the (2) two - 2" National Pipe Thread Ports the system provides. This diffuser provides convenient 2" N.P.T. male threads for insertion into the 2" N.P.T. female fittings that are molded into the tank assembly. The product's user may use either of the two bottom ports provided for the drawing of or returning of hydraulic fluid to the tank assembly. Diffuser design prevents the aeration of returning hydraulic fluid without reducing the rate of fluid flow in gallons per minute below the rated pump capacity at 1000 rpms.

The present invention also provides the use of metal compression fitting ports, designed to be molded into the tank for use as accessory ports. This proprietary design provides additional strength as used in the rotation molding process, and when used with the externally mounted threaded nut will provide a compression seal to prevent any leakage from the tank assembly.

Basic to the present invention is the overall design of the molded tank. The rotation molding process, that of rotating the design tool fixture through an oven with sufficient heat as to melt the plastic powder material and to form a uniform walled tank assembly, will cause distortion in a tank as a result of normal processing. As the design tool fixtures are cooled upon exiting the oven area, water is applied to cool each part. This results in the exterior skin of the polyethylene tank cooling more rapidly than the inside wall. This results in a "short skin" or more shrinkage on the outside than on the inside wall. This phenomenon results in a natural tendency for the tank to bow-in, especially if the unit is exposed to recurring occasional heat in the 120°-145° range—such as is seen in the tank system application. The present invention addresses this problem by maintaining areas with minimum flat surface area. Strapping guides are, in reality, designed to break up the flat surface area, and are recessed to provide reinforcement of the tank. The larger surface areas have been designed with a crown in the material, again to control the normal tendencies of the material resulting from the manufacturing process. It is important to the industry that this tank assembly provide for 50-55 gallon capacity; consequently, the dimensioning of this tank assembly is extremely important in providing the volume required by the industry and in providing a polyethylene tank that will retain its original shape and design to be aesthetically pleasing, as well as functional, for the end user.

Additionally, the tank system is known as an open system—or one that draws and displaces air as hydraulic fluid is drawn from or returned to the tank. The present invention provides a filler/breather assembly, as well as a bayonet-style, 40 micron breather cap. The filler/breather assembly consists of a nylon screen assembly extending 4" down into the tank through the filler port. This assembly allows more air to be displaced than previous art. The assembly also acts as a buffer to break up the movement of hydraulic fluid and prevent material from "sloshing" out of the fill cap.

All parts and assemblies described herein are shipped in kit form, complete in one 200# test weight corrugated carton, which has the following dimensions: $41\frac{1}{8}$" long, $16\frac{1}{8}$" wide, and $27\frac{1}{8}$" high.

These and further and other objects and features of the invention are apparent in the disclosure, which includes the above and ongoing written specification, with, the claims and the drawings.

BRIEF DESCRIPTION OF THE DRAWINGS

FIGS. 4A, 4B and 4C are top, side and end views of a tank mounting base, and

FIGS. 4D and 4E are front and side views of four chassis mounting angles.

FIGS. 6A and 6B are schematic side and end views of a diffuser assembly—one required per assembly.

FIGS. 7A and 7B are a side cross-section and top view of compression port fittings—two required per assembly and FIGS. 7C and 7D are a side cross-section and top view of a compression nut for threading on the compression port fitting.

DETAILED DESCRIPTION OF THE DRAWINGS

Figure 1:
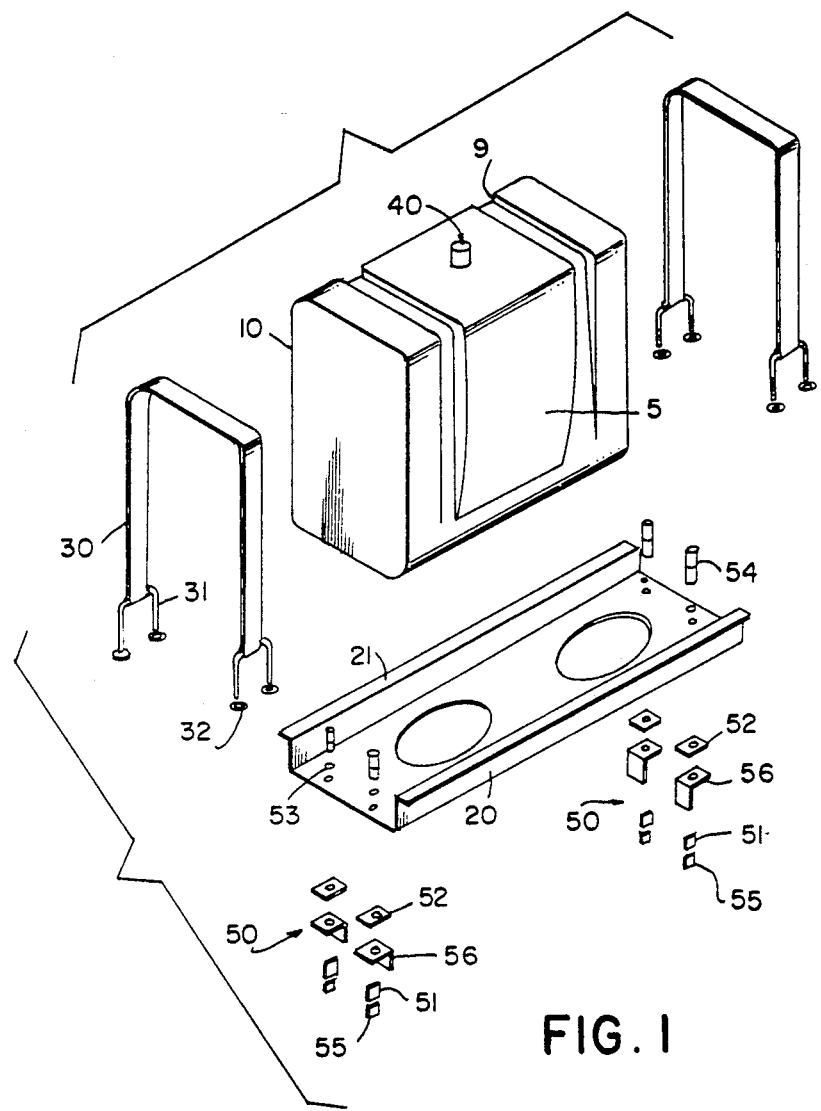
FIG. 1 is a schematic illustration of the present invention and provides a perspective view of "THE AMERICAN WET TANK SYSTEM" and the parts that make up the completed kit.
Figure 5:
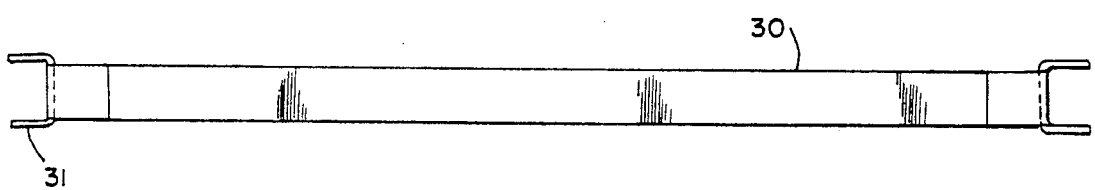
FIG. 5 is a schematic illustration of tank mounting straps—two required per assembly.

FIG. 1 discloses the "AMERICAN WET TANK SYSTEM" component parts as required for shipment of the complete kit. Shown is the tank assembly 10 of the present invention which is mounted to the base 20 by means of strap assembly 30. Tank assembly is mounted to truck chassis by means of a mounting kit 50, which includes four mounting angles 56, four rubber mounting pads 52, bolted as shown with four bolts 54 which extend through holes 53 in carriage base 20, four washers 53, four nyloc nuts 55 and four 115# compression springs 51.

Figure 2:
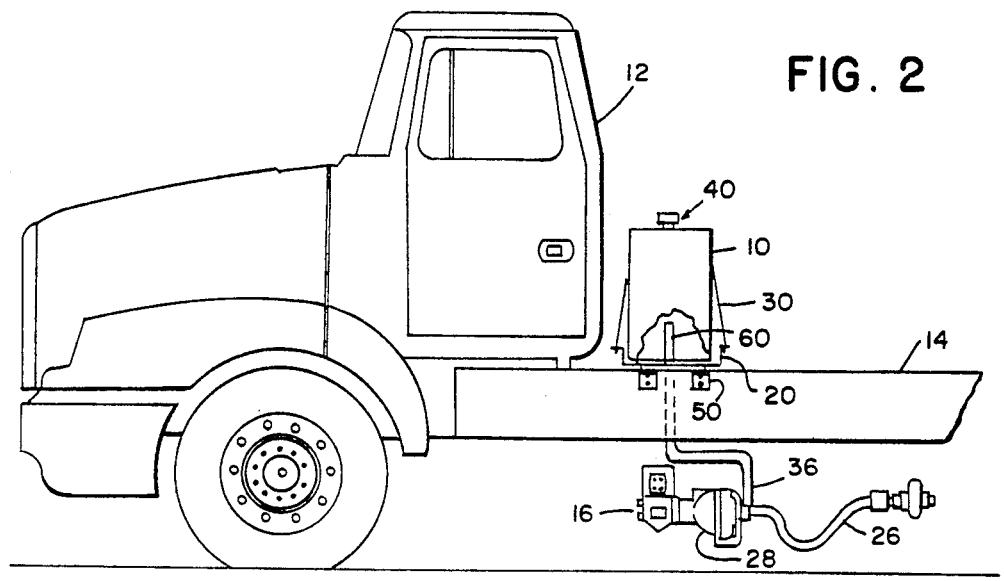
FIG. 2 is an illustration of the present invention installed on a vehicle chassis with "Tank System" located rearward of the cab.
Figure 3C:
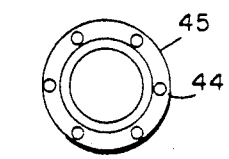
FIGS. 3A, 3B, 3C and 3D are respectively schematic illustrations of side and end views of a tank and top and side views of a mount boss of a polyethylene tank assembly indicating tank design, detail on fill port mounting boss, diffuser placement, and compression fitting port locations.
Figure 3D:
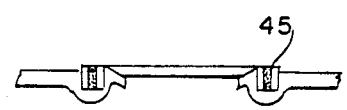
Figure 3B:
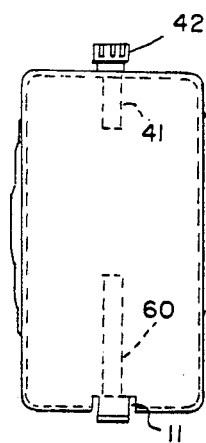
Figure 3A:
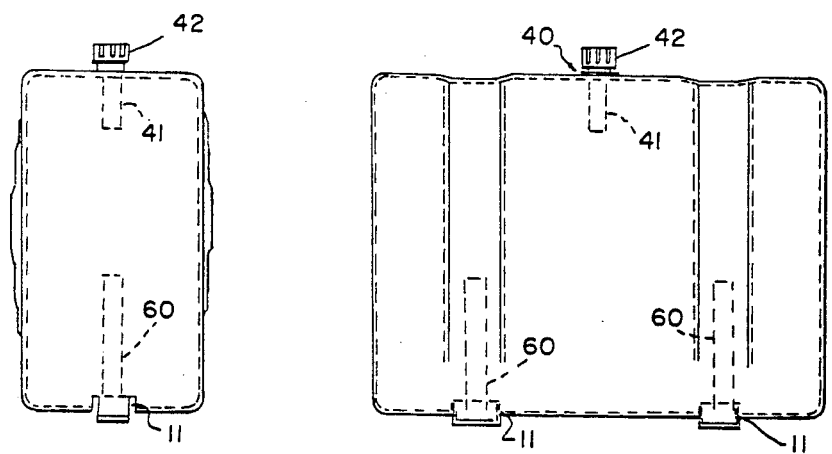

FIG. 2 discloses the tank assembly 10 of the present invention installed on a truck 12 as the storage component of a hydraulic system for supplying fluid under pressure to hydraulically actuated devices, such as a dump body (not shown) mounted on the rear portion of truck frame 14. The hydraulic system may also be used to supply fluid under pressure to additional fluid operated equipment associated with the vehicle, such as hoists, winches, lifts, etc.

Power for the hydraulic system is supplied by a power take-off unit 16 which is driven by the truck power train, not shown. A driven output shaft 16 transfers power from the power take-off unit 16 to the input shaft 28 of hydraulic pump 28. Hydraulic fluid is conveyed under pressure from pump 28 through conduit 26 to the dump body actuating mechanism, or to other hydraulically operated equipment associated with truck 12.

Hydraulic fluid for use in the above-described system is stored in tank assembly (FIG. 1), which comprises a tank 10 with crowning 5 on both sides between indentations 9 mounted by means of a platform 20 to the truck frame 14. Straps 30 extend in indentations 9 around the periphery of tank 10 and fasten the tank assembly 10 to platform 20 with U-bolts 31 which extend through holes 21 and which are secured with nuts 32 (FIG. 1). A breather cap 42 of filler breather assembly 40 is provided on top of the tank 10 to prevent build up of pressure inside the tank. Filler breather assembly 40 has a four inch long nylon mesh basket 41 and a 40 micron filter bayonet cap 42 attached to a fill opening 43 in the tank by six screws 44 corresponding to the brass inserts 45 molded in the polyethylene material. Dual port openings 8 with metallic port fittings 11, forming leak-proof compression seals 7 (FIG. 3) are provided in the bottom of the tank. In building a standard two-line system, one port is sealed with a 2" N.P.T. plug. A diffuser unit 60 (FIG. 6) is screwed into remaining port 11 with conduit 36 screwed into the 1¼" N.P.T. port in the bottom of the diffuser.

Actual arrangement of plumbing is determined by the installer. Tank allows single line installation for drawing and returning hydraulic fluid to tank or the use of two ports, one to draw fluid into system with second line plumbed to second port for hydraulic fluid returning to the tank. The present invention allows for more flexibility in system design for the installer/user.

The opposite end of conduit 36 is connected to pump 28. Pump 28 is adapted to pump hydraulic fluid stored in the tank 10 through port 11 (FIG. 3) and conduit 36 and thence through conduit 26 to the hydraulically operated equipment associated with truck 12. Assuming such equipment comprises a conventional dump body, hydraulic fluid passing from pump 28 to conduit 26 will function to raise the dump body to an inclined position relative to the truck frame 14. When it is desired to lower the dump body from a raised position, the valve on pump 28 is placed in the "lower" position allowing the weight of the dump body to force the hydraulic fluid back through conduit 26, pump 28 and conduit 36 to tank assembly 10.

Industry standards also call for the installation of what is commonly called a "three line system". This would require use of both bottom tank ports 11 (FIG. 3). Diffuser 60 (FIG. 6) would be installed in one of the bottom metal ports 11 (FIG. 3). Conduit 36 would be installed in opposite tank port fitting 11 and connected to pump as described above. A third line (not shown) is run from the dump body hydraulic cylinder to the second tank port fitting 11 to complete the system. Either system is acceptable; however, the three line system continually cycles the system and results in less heat being produced.

FIGS. 3, 4, 5, 6 and 7 disclose the specific design of the polyethylene tank and the components that make up the "American Wet Tank System". FIG. 3 indicates the position and size of the metal port fittings 70 (FIG. 7) which are molded into the bottom of tank 10 (FIG. 1). Compression nuts (2 required) 71 (FIG. 7) screw on the portion of the fittings extending out the bottom of the tank. These nuts 71 (FIG. 7) are torqued to a pressure resulting in the compression of the polyethylene material between the nut and the molded fitting. This results in a strong, leak proof fitting. Dimensions of the tank (FIG. 3) indicate the reinforcing strap guides, radius corners, and the largest surfaced areas crowned, as reinforcement against distortion from the occasional heat build up as hereinbefore described. This design and its resulting dimensions create the optimum size tank to meet industry standards for storing hydraulic fluid for mobile power applications in the heavy duty truck market.

FIG. 6 discloses the design and specific dimensions of the filter/diffuser 60. Use of this diffuser 62 prevents returning hydraulic fluid from aerating as it returns to the tank. Perforations 64 shown result in allowing the velocity of returning fluid to be reduced without reducing the rate of flow in gallons per minute below the rated pump capacity at 1000 rpms. This filter/diffuser is designed with threads 66 for standard National Pipe Thread openings and conveniently fits either of the tank port openings 11 (FIG. 3). Diffuser/filter system is inserted into the tank port from the outside and screwed into place using standard pipe dope material to provide leak proof seals.

As previously stated, the rotation molded polyethylene tank provides a contaminant-free environment, is uniform in thickness and seamless. The polyethylene tank is tough, rigid, lightweight, abrasion resistant and corrosion-free. The design, as described, eliminates the distortion and warping problems presently encountered by polyethylene tanks used in the mobile power application in the heavy duty truck market.

Bottom tank port fittings, as described, eliminate the possibility of leaks as experienced by users of the present art. Fittings further provide added strength to port area, flexibility in system design, and a convenient method of installing filter/diffuser unit, as well as conduit attachment.

The filter/diffuser assembly offers the installer/user the option of utilizing either port as a return line and the convenience of N.P.T. ports, simply sealed with the use of a standard pipe dope material.

The entire "wet tank assembly" is conveniently packaged and shipped to the installer/user in a single carton.

The foregoing embodiment is exemplary of the invention and the prototype unit now developed; however, any variation adopted may be made without departing from the spirit and scope of the invention as defined in the following claims.

I claim:

1. A tank assembly comprising a rotationally molded polyethylene material tank, comprising a rectangular shape, further comprising indentations in the tank for reinforcing the tank against distortion and for guiding alignment guides, a carriage base adjacent the tank, retaining straps in the guides for attachment of the tank to the carriage base, U-bolt attachments at ends of the retaining straps and extending through holes in the carriage base; further comprising two port openings having two metallic port fittings molded into the polyethylene material of the tank for forming a component part of leak proof compression seals; further comprising a filler/breather assembly at a top of the tank; further comprising a filter/diffuser connected to one of the port fittings for retarding returning fluid velocity without reducing flow in gallons per minute; further comprising a chassis attachment kit connected to the carriage base for mounting the carriage base and the tank assembly, further providing a crowning of both sides of the tank between the indentations for providing reinforcement and for resisting distortion caused by occasional heat build up; further providing, for attachment to the two metallic port fittings molded in the polyethylene material, two externally attached compression nuts to provide said leak proof compression seals; the two port fittings and the nuts being adaptable for an installer/user plumbing arrangement and to allow external installation and sealing of said filter/diffuser in either port opening.

2. The apparatus of claim 1, the filler breather assembly further comprising a filler/breather assembly of a four inch long nylon mesh basket, a 40 micron filter bayonet cap attached to a fill opening in the tank by means of six screws corresponding to brass inserts molded into the polyethylene material.

3. A wet tank assembly suitable for packaging and transportation and resistance to distortion, comprising a tank having dual screw-in ports; an externally mounted, screw-in filter/diffuser connected to one of the ports, a filler/breather assembly connected to the tank for providing passage of air into and out of the tank; attachment straps, circumferential indentations on the tank for providing reinforcement, as well as for serving to guide the attachment straps, corresponding U-bolts attached to ends of the straps, a carriage base, through holes provided in the carriage base for receiving the U-bolts; further comprising a chassis attachment kit consisting of four pre-punched mounting angles, four mounting pads, four cap screws, four lock nuts, four compression springs; all prepackaged into a single shipping carton, which consists of one corrugated carton; this complete tank assembly with corresponding carton providing shipment of complete product by parcel service; further the tank assembly dimensions do not exceed 130" girth and length.

4. The wet tank assembly of claim 3, wherein the four mounting pads have a 70 durometer.

5. The wet tank assembly of claim 3, wherein the four compression springs are 115# springs.

6. The wet tank assembly of claim 3, wherein dimensions of the shipping carton are about $41\frac{1}{8}$" long by $16\frac{1}{2}$" wide by $27\frac{1}{8}$" high.

7. The wet tank assembly of claim 3, wherein the shipping carton is a 200 pound test weight carton.

8. The wet tank assembly of claim 3, wherein the entire assembly and carton weighs less than 70 pounds.

* * * * *